June 8, 1954 — P. F. BECHBERGER — 2,680,373

THRUST INDICATOR SYSTEM

Filed July 5, 1949

INVENTOR.
PAUL F. BECHBERGER
BY
O.J. Brattie

ATTORNEY

Patented June 8, 1954

2,680,373

UNITED STATES PATENT OFFICE 2,680,373

THRUST INDICATOR SYSTEM

Paul F. Bechberger, Tenafly, N. J., assignor to Bendix Aviation Corporation, Teterboro, N. J., a corporation of Delaware Application July 5, 1949, Serial No. 102,989

2 Claims. (Cl. 73—88.5)

The present invention relates generally to measuring devices and more particularly to a novel apparatus for measuring the thrust of an aircraft engine during accelerations of the craft.

While it is relatively simple to measure the thrust of an engine mounted in a craft when the craft is flying at constant speed, in some instances, it is desirable to determine the total thrust of an engine during acceleration of the craft. The force exerted on the craft by the engine during acceleration of the craft is only a portion of the total thrust delivered by the engine, because the remainder of the engine thrust is used to accelerate the engine mass.

The present invention contemplates novel and simple means for accurately determining the total thrust produced by an engine during acceleration of the craft on which it is mounted.

An object of the invention, therefore, is to provide novel means whereby the total thrust of an engine may be accurately measured while the craft on which it is mounted is accelerating.

Another object is to provide novel, simple and reliable means for measuring the total thrust of a jet engine mounted on an aircraft.

These and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not intended as a definition of the limits of the invention.

In the drawing wherein like reference characters refer to like parts in both views.

Figure 1:
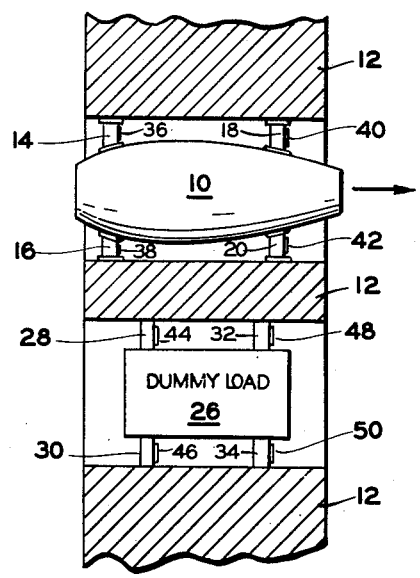
Figure 1 illustrates schematically the novel apparatus hereof for accurately determining the total thrust of an engine according to the present invention.

For a better understanding of the present invention, the novel apparatus thereof is shown in Figure 1 of the drawing as applied to a jet engine, designated by the numeral 10, mounted on a frame 12, such as an engine fuselage, by four rigid supports 14, 16, 18 and 20, the engine producing a thrust in the direction of the arrow. In order to provide sufficient strength to support the engine, the supports may be steel columns bolted to the frame and to the engine, respectively. Arranged in a predetermined relation with the thrust axis of the engine, such as on an axis parallel or coaxial therewith, is a dummy load 26 mounted on frame 12 in a manner similar to the mounting of the engine, by four columns 28, 30, 32 and 34.

It will be apparent to those skilled in the art that under constant speed during level flight of the aircraft there are no bending stresses on the supports of the dummy load and that the bending stresses on the engine supports are a direct function of the axial thrust of the engine.

During accelerations of the craft brought about as by increasing the power of the engine, the total trust of the engine is equal to the force $F_1$ exerted by the engine on the supports 14, 16, 18 and 20 plus the mass $M_1$ of the engine times the acceleration $a$ of the craft less the gravity component $g \sin \theta$ where $\theta$ is the dive angle of the craft. This may be expressed by the equation $$\text{Total thrust} = F_1 + M_1(a - g \sin \theta) \quad (1)$$

During acceleration of the craft, the force $F_2$ exerted on supports 28, 30, 32, 34 by the dummy load is equal to the mass $M_2$ of the dummy load times the acceleration $a$ of the craft, less the gravity component $g \sin \theta$. The force $F_2$ is in the opposite direction to the force $F_1$ and may be expressed by the equation $$-F_2 = M_2(a - g \sin \theta) \quad (2)$$

If the dummy load has the same mass as the engine, then $$M_1 = M_2 \quad (3)$$

and the force exerted on supports 28, 30, 32, 34 is equal to the acceleration force on the engine mass—that is, $$M_1(a - g \sin \theta) = M_2(a - g \sin \theta) = -F_2 \quad (4)$$

The total thrust of the engine during acceleration of the craft then may be determined by adding algebraically the force $F_1$ exerted on engine supports 14, 16, 18, 20 and the force $F_2$ exerted on dummy load supports 28, 30, 32, 34—that is, $$\text{Total thrust} = F_1 - F_2 \quad (5)$$

However, it is not practical to provide a dummy load of the same mass as the mass of the engine, and the same result may be achieved in the manner indicated hereinafter.

According to the present invention a change in resistance proportional to the total deflection or stress of supports 14 and 16 and of supports 18 and 20 of the engine is applied across opposite legs of a bridge, respectively, and a change in resistance proportional to the total deflection or stress of supports 28 and 30 and of supports 32 and 34 of the dummy load is applied across the two remaining legs, respectively. The bridge circuit is balanced when the craft is at rest. In the absence of acceleration, i. e., when the craft flies at constant speed, the engine supports are deflected to change the associated resistances in proportion to the thrust of the engine, and the bridge circuit will be unbalanced by an amount corresponding to such thrust.

The bridge will be unbalanced by an amount corresponding to the total thrust of the engine during acceleration or deceleration of the craft if the change in resistance of two opposite legs of the bridge in response to the acceleration or deceleration force is equal to the change in resistance of the other two opposite legs of the bridge in response to the acceleration or deceleration force.

Figure 2:
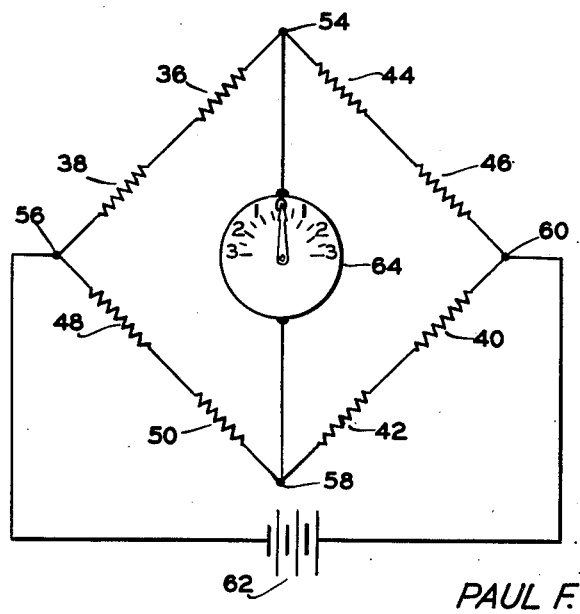
Figure 2 is a circuit diagram of a bridge circuit utilized for measuring the total engine thrust with the novel apparatus of Figure 1.

In the illustrated embodiment of the invention the deflections of the supports are measured with conventional strain gages attached to each of the supports. The strain gages, indicated in Figure 1 by reference numerals 36, 38, 40 and 42, are shown as attached to engine supports 14, 16, 18 and 20, respectively, and the strain gages indicated by reference numerals 44, 46, 48 and 50, are shown as attached to dummy load supports 28, 30, 32 and 34, respectively. The strain gages are connected in a Wheatstone bridge circuit in the manner indicated in Figure 2, strain gages 36 and 38 being connected between points 54 and 56 of the bridge and gages 40 and 42 between points 58 and 60. Strain gages 44 and 46, on the other hand, are connected between points 54 and 60 of the bridge circuit and strain gages 48 and 50 are connected between points 56 and 58. A source of electric potential such as a battery 62 is connected across points 56 and 60 and a sensitive indicating device such as a galvanometer 64 is connected across points 54 and 58 in a manner well known in the art. Proper proportionality factor between the indications of the strain gages associated with the engine and with the dummy load may be obtained by using strain gages of different sensitivity or by making the supports of the dummy load of such a size or material as to compensate for the difference in mass of the engine and the dummy load.

Coming now to the operation of the illustrated system, the bridge circuit will be balanced and the galvanometer 64 will read zero when the craft is at standstill or when the craft is travelling at constant speed with the engine 10 inoperative. With the engine operating and with no acceleration of the craft on which it is mounted, the resistances of strain gages 36, 38 and 40 and 42 will change by an amount proportional to the deflection or stress of the supporting members 14, 16, 18 and 20 and the bridge will be unbalanced by an amount proportional to the total thrust of the engine. Under this condition, the dummy load will exert no axial force on its supports and, therefore, the resistances of strain gages 44, 46, 48 and 50 will remain unchanged. When the craft is accelerating the force exerted by the engine along the thrust axis thereof on its supports will be equal to the total thrust of the engine less the mass of the engine times the acceleration of the craft, and the resistances of the strain gages associated with the engine supports will change by an amount proportional to this force. The force exerted by the dummy load on its supports in a direction parallel to the thrust axis of the engine will be equal to the mass of the dummy load times the acceleration of the craft and the resistances of the strain gages associated with the supports of the dummy load will be changed by a corresponding amount. By properly selecting the size and the materials of the supports for the engine and dummy load so that the sensitivity of the strain gages associated with the engine supports and the sensitivity of the strain gages associated with the dummy load supports are inversely proportional to the respective masses of the engine and the dummy load, the deflection of the galvanometer due to the resulting unbalance of the bridge circuit will indicate the total thrust of the engine during acceleration of the craft. Obviously the thrust during deceleration of the craft will also be indicated by the deflection of the galvanometer.

Although but one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

I claim:

1. In a system for measuring the thrust of an engine during acceleration of a craft on which the engine is mounted, a plurality of members for mounting said engine on said craft, a dummy load, a plurality of members for mounting said dummy load on said craft in a predetermined relation to said engine, strain gages mounted on said engine mounting members and responsive to stress on said engine mounting members in a direction parallel to the thrust axis of said engine, other strain gages mounted on said dummy load mounting means and responsive to stress on said dummy load mounting means in a direction parallel to the thrust axis of said engine, said strain gages being of a sensitivity inversely proportional to the mass of said engine and said dummy load, and circuit means connecting said strain gages to form a bridge circuit for comparing the quantities developed by said strain gages for deriving the thrust of said engine.

2. In a system for determining the total thrust of an engine during acceleration of a craft on which the engine is mounted, a plurality of parallel members for mounting said engine on said craft, a dummy load, a plurality of parallel members for mounting said dummy load on said craft, said engine and dummy load being mounted on an axis parallel with the thrust axis of said engine, strain gages mounted on said engine mounting members and responsive to stress parallel with said thrust axis to change resistance as a function of stress force thereon, other strain gages mounted on said dummy load mounting members and responsive to stress parallel with said thrust axis to change resistance as a function of stress force thereon, and circuit means connecting said strain gages to form a bridge circuit, the unbalance of which is an indication of the total thrust of said engine.

References Cited in the file of this patent

UNITED STATES PATENTS

| Number | Name | Date |
| --- | --- | --- |
| 1,746,627 | Babbitt | Feb. 11, 1930 |
| 2,360,886 | Osterberg | Oct. 24, 1944 |
| 2,362,303 | Roberts | Nov. 7, 1944 |
| 2,367,017 | Gardiner | Jan. 9, 1945 |
| 2,385,005 | Langer | Sept. 18, 1945 |
| 2,426,089 | Fitzgerald | Aug. 19, 1947 |
| 2,446,537 | Hickman | Aug. 10, 1948 |
| 2,457,700 | Martin et al. | Dec. 28, 1948 |